Sept. 8, 1970   R. A. MYERS   3,527,335
ROTARY ELEVATOR HINGED SUPPORT UNLOADING DOOR
Filed Nov. 20, 1967
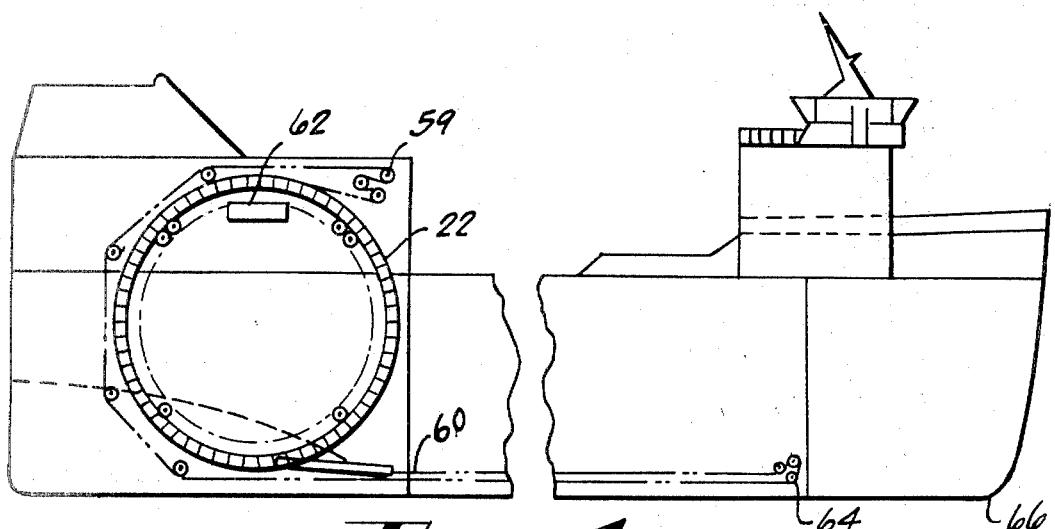
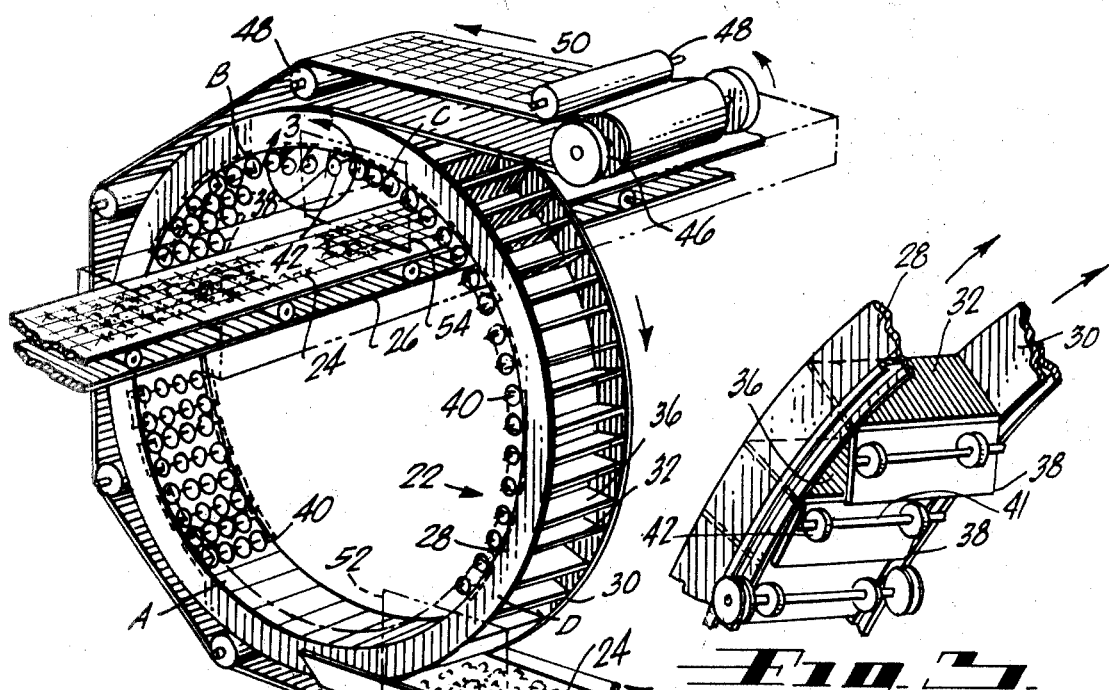
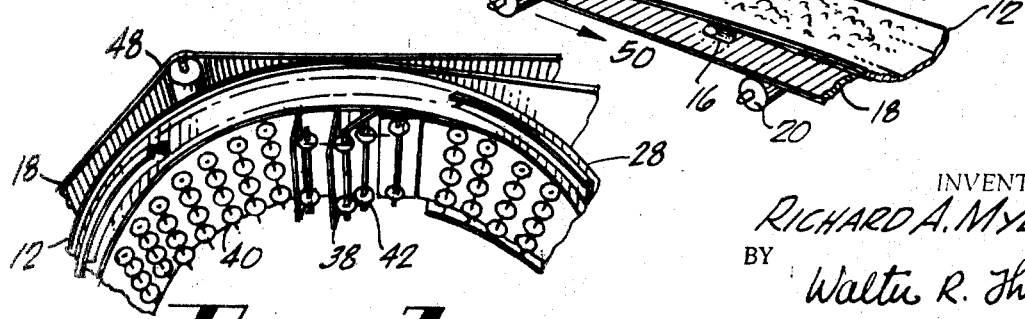
INVENTOR.
RICHARD A. MYERS
BY Walter R. Thiel
-ATTORNEY-

United States Patent Office 3,527,335
Patented Sept. 8, 1970

3,527,335
ROTARY ELEVATOR HINGED SUPPORT UNLOADING DOOR
Richard A. Myers, Rolling Hills Estates, Calif., assignor to Hewitt-Robins, Incorporated, Stamford, Conn., a corporation of Delaware
Filed Nov. 20, 1967, Ser. No. 684,153
Int. Cl. B65g *37/00, 47/00*
U.S. Cl. 198—103                                        6 Claims

ABSTRACT OF THE DISCLOSURE

An elevating wheel in combination with a moving belt conveyor for elevating material carried by the conveyor. The wheel is supported by a plurality of resilient members and includes a plurality of storage compartments formed around its periphery, each including an exterior opening and an interior opening having a pivotal door which is held closed through the aid of the resilient members while the compartment is rotated from a loading location to a discharge location. The belt conveyor wraps around a section of the periphery of the wheel trapping the material in the storage cells and rotating the wheel.

BACKGROUND OF THE INVENTION

Conventional endless belt conveyors can generally convey bulk materials up maximum inclines in the order of 10° to 20°. If the angle of inclination for this type of conveyor is increased above this upper limit, the free-flowing character of some bulk materials will cause the material on the inclined portion of the conveyor to slide down toward the bottom of the incline. The shifting bulk material will cause spillage problems and decrease the conveying capacity of the conveyor.

Another problem with conventional belt conveyors is the need for a relatively long horizontal distance to elevate the conveyed material through a relatively large vertical distance. A second reason is the requirement that the transition from the horizontal portion of a conveyor to the inclined portion be very gradual to prevent the horizontal portion of the conveyor belt from lifting off the idlers. Thus, the transition portion of the conevyor must be designed to allow the conveyor belt to move through an upward vertical curve having a very large radius if the conveyor belt is to be properly supported in this location.

It will therefore be apparent that a conventional belt conveyor would be unsuitable in those situations where, because of space limitations, the conveyed material must be elevated a relatively large distance vertically within a relatively short horizontal distance.

One prior art solution to these problems suggested the use of a second belt arranged to travel in face-to-face relationship with the inclined section of the conveyor belt to hold the conveyed material between the two belts as the material is elevated or conveyed up the incline. This type of system necessitates two independent belt systems and a mechanical or electrical system to synchronize the speed of the entire system.

Other prior art solutions have employed additional pieces of material-handling equipment such as bucket elevators to lift the conveyed material. This type of solution is not completely satisfactory; bucket elevators travel relatively slowly and extremely large buckets are required if it is to convey the same capacity as the conveyor. In addition, a bucket elevator is a separate piece of equipment having an independent drive and control system which must also be synchronized with the conveyor.

Patent application Ser. No. 670,581, filed Sept. 26, 1967, entitled "Rotary Elevator" and assigned to the same assignee, teaches the use of a wheel structure in combination with a belt conveyor for elevating material carried by the conveyor. The wheel is divided into a plurality of radial cells or compartments which picks the conveyed material up from the belt conveyor and moves it to the desired elevation. The wheel is rotated by the belt conveyor moving in contact with a portion of the periphery of the wheel preventing the material from falling out of each cell by closing the exterior side while the interior side is closed by a backing plate. The present invention was developed to improve certain aspects of this elevating wheel.

SUMMARY OF THE INVENTION

The present invention improves upon prior art systems by supporting the elevating wheel on a plurality of resilient members and trapping the conveyed material in the compartments in the wheel between the belt on the outside and a pivotal plate or door on the inside. The resilient members apply a closing force to the doors and prevent the material from being discharged until the desired location.

Accordingly, one object of the present invention is to provide improved elevating means for use in combination with a belt conveyor for elevating conveyed material a relatively large height within a relatively short distance.

Another object is to provide an improved elevating wheel in combination with a belt conveyor whereby conveyed material on the belt conveyor can efficiently be elevated from a loading location to a discharge location.

A further object of the invention is to provide an improved elevating wheel which is resiliently mounted and includes storage compartments having one side closed by a pivotal plate.

DESCRIPTION OF THE DRAWINGS

Other objects, advantages and novel features of the present invention will become apparent from the following detailed description of the invention when considered in conjunction with the drawings wherein:

FIG. 1 is a perspective view of one embodiment of the improved elevating wheel of the present invention, including a portion of two belt conveyors which operate in combination with the wheel to provide an entire conveying system. For clarity the structure supporting the resilient members and the retaining devices in the area of the unloading location are not shown.

FIG. 2 is a perspective view of the improved wheel of the present invention and a first belt conveyor system showing the operation of the pivotal plates at the unloading location. For clarity the structure supporting the stop rollers is not shown.

FIG. 3 is an enlarged view of the portion of the improved elevating wheel of the present invention enclosed by circular arrow 3 in FIG. 1.

FIG. 4 is a side view of a schematic representation of a cargo vessel showing one embodiment of the present invention positioned in the stern section of the vessel and operative in combination with two belt conveyor systems.

DETAILED DESCRIPTION OF THE INVENTION

Referring now to the drawings, one embodiment of the present invention includes a conventional conveyor system 10 with a first belt conveyor 12 having a conveying reach 14 supported by a plurality of troughing idler roll assemblies 16 and a return reach 18 supported by a plurality of straight return idler assemblies 20. At the head end of the conveyor system 10 an elevating wheel 22 cooperates with the conveyor belt, as will hereinafter be described, to raise a conveyed material 24 to a second belt conveyor 26.

The elevating wheel 22 is formed with spaced, substantially parallel annular rim structures 28, 30 coupled together by equally-spaced radial partition members 32. The rim structure may be composed of a number of different conventional structural elements such as channels, side plates, guide rails and support rollers which cooperate with the guide rails in order to rotatably mount the wheel 22, but these elements will not be described herein. Reference may be made to patent application Ser. No. 670,581 for a detailed description of this structure. The rim structures 28, 30 combine with partitions 32 to form a plurality of substantially rectangular storage cells or compartments 36 located around the periphery of the elevating wheel 22. The storage cells have exterior loading openings which open radially outwardly around the periphery of the elevating wheel and interior unloading openings which open radially inwardly toward the center of the elevating wheel. The interior openings are closed by a plate or door 38 pivotally affixed in a conventional manner to the rim structures 28, 30.

The elevating wheel is rotatably supported in the manner described in patent application Ser. No. 670,581 and also by a plurality of resilient members 40, shown in this embodiment as shaft-mounted rubber wheels or pneumatic tires, as seen in FIG. 2. In the embodiment disclosed, while four wheels are employed with each shaft 41 and these are positioned transversely of the elevating wheel, it should be understood that the number of wheels and the orientation thereof may be varied within the scope of this invention. The shafts containing the wheels are rigidly mounted in conventional support structure, which has not been shown for the sake of clarity but which structure is located in general proximity to the rims 28, 30, FIG. 2. The wheels 40 are mounted on these shafts with suitable bearing means to insure easy rotation.

The resilient members 40, shown as rows of wheels, engage the interior surface of the elevating wheel formed by the plates 38 between points A-B and C-D, as shown in FIG. 1. Thus, the rows of wheels 40 help support the elevating wheel 22 and also hold the pivotal doors 38 closed as the elevating wheel rotates from point A to point B. In this manner, material in the compartments 36 is prevented from being discharged through the inside openings of the compartment as the compartments move between points A and B. At point B the rows of wheels 40 terminate and the doors 38 swing open and allow the material to be discharged onto the second belt conveyor 26. A row of retaining devices or stops shown as offset wheels 42, which can be the same as wheels 40, are provided at the unloading position 54 to prevent the doors 38 from freely swinging as each plate clears the last row of wheels 40 and which also serves to gradually close each door after discharge of the material.

As shown in FIG. 1 the troughed section of the conveying reach 14 is first flattened out as the belt approaches the elevating wheel 22 at the loading position 52. Side boards 44 may be employed on either side of the conveyor belt at this location in order to prevent spillage. The belt closes the outside openings of the compartments 36 in that section of the wheel defined by A-B in FIG. 1 with one surface of belt in frictional contact with the outer peripheral surface of each rim structure 28, 30, and partition members 32, as seen in FIGS. 1 and 2. The frictional contact between the belt and the elevating wheel is designed so that the belt will drive the elevating wheel at substantially the same surface speed as the conveyor belt. After the belt has extended around the elevating wheel, it is reeved about head drive pulley 46 and is guided back down to the straight conveyor section by rollers 48. The belt then travels over the straight idler rollers 20 to the tail pulley assembly (not shown).

In operation the conveyor is driven by head pulley 46 in the direction indicated by arrows 50. The conveying reach 14 of the conveyor belt 12 is gradually flattened from its troughed position as it approaches the rotating elevating wheel 22 and is wrapped around a peripheral section of the elevating wheel. The material 24 on the conveying reach 14 is then forced into the storage compartments 36 of the rotating elevating wheel 22 at the loading position 52 and the material trapped in the compartments is then elevated to the discharge or unloading position located over the second conveyor 26. The material in the compartments shifts as the conveyed material is elevated but is prevented from falling out by the wheels 40 bearing against the doors 38. This retaining force is applied from points A to B. Thus, the pivotal doors cover the unloading openings of the compartments as the move through that portion of the path between the loading position and the discharged position.

The above-described elevating means can be employed at almost any location where material on belt conveyors must be elevated a relatively large height within a relatively short distance. For example, this invention can be employed with a discharge conveyor located in a self-unloading vessel. In this case the conveying reach extends beneath the storage holds and a mechanism is employed for loading material from the storage holds onto the conveying reach. In one particular type of self-unloading vessel, as shown in FIG. 4, a head end 59 of a discharge conveyor 60 and the elevating wheel 22 are located at the stern of a vessel and a tail end 64 of the discharge conveyor 60 is located near the bow section 66. In this embodiment the elevating wheel 22 elevates the material which is unloaded from the cargo holds by suitable automatic devices (not shown) onto the discharge conveyor 60 to a shuttle or overboard conveyor 62 in an arrangement similar to that shown in the drawings.

While one embodiment of this invention has been illustrated, it will be appreciated by those skilled in the art that variations in the disclosed arrangement, both as to their details and as to the organization of such details, may be made without departing from the spirit and scope thereof. Accordingly, it is intended that the foregoing disclosure and the showings made in the drawings shall be considered as illustrative of the principle of the invention and not construed in a limiting sphere.

What is claimed is:

1. An elevating wheel in combination with a conveyor belt having a conveyor reach, said wheel having a plurality of storage cells adapted to receive material carried by said conveying reach at a loading location and to elevate said material to an unloading station, each of said storage cells having a loading opening which opens outwardly from the outer periphery of said wheel and an unloading opening which opens inwardly, means for rotatably mounting said wheel and having a section of the conveying reach wrapped around a peripheral section of said wheel so as to enable the transfer of material on said conveying reach into said storage cells, the improvement in said elevating wheel comprising each of said storage cells being closable by plates pivotally mounted to said wheel, resilient support means being mounted relative said wheel so as to enable said wheel to rotate relative said support means, said support means being positioned at least between said loading station and said unloading station and contacting the plates of said wheel which move between the loading station and said unloading station whereby the unloading openings of the storage cells in said wheel are closed by their plates as the storage cells move between the loading station and the unloading station.

2. The elevating device of claim 1 wherein said resilient support means comprises a plurality of resilient wheels rotatably supported on shafts and adapted to engage the plates as said wheel moves from the loading location to the unloading location.

3. The elevating device of claim 2 wherein said plurality of resilient wheels comprise rows of pneumatic tires, each row being supported on a shaft parallel with the axis of rotation of the elevating wheel.

4. The elevating device of claim 1 including retaining means at said unloading location to restrain the rotation of said pivotal door during the discharge of said material.

5. The elevating device of claim 4 wherein the retaining means are identical to the resilient support means.

6. The elevating device of claim 1 wherein the resilient support means engage each pivotal plate at least during that portion of its movement from the loading location to the unloading location where the weight of the material in each cell would cause the plate to pivot.

References Cited

UNITED STATES PATENTS 708,583   9/1902   Powell.

RICHARD E. AEGERTER, Primary Examiner

U.S. Cl. X.R.

198—25